Patented June 13, 1944

2,351,025

UNITED STATES PATENT OFFICE 2,351,025

PREPARATION OF ARYL ETHERS OF TRIHYDRIC ALCOHOLS

Kenneth E. Marple and Theodore W. Evans, Oakland, Calif., assignors to Shell Development Company, San Francisco, Calif., a corporation of Delaware No Drawing. Application January 21, 1941, Serial No. 375,256

4 Claims. (Cl. 260—613)

This invention relates to an improved process for the preparation of aryl ethers of trihydric alcohols.

It is an object of the present invention to provide an improved method for synthesizing aryl ethers of trihydric alcohols which enables higher yields of the desired products to be obtained than were heretofore possible. A further object is to provide a modified process which obviates a number of the difficulties encountered with prior methods. Another object resides in providing a method readily adaptable to technical scale manufacture of the valuable products of the process. Other objects of the invention will be apparent from the description given hereinafter.

Various methods of synthesizing aryl ethers of glycerol are described in the prior art. Among these, there is given the method of forming the sodium salt of a phenol by reacting the phenol with solid sodium hydroxide and subsequently reacting the formed salt with a chlorhydrin of glycerol to obtain an aryl ether of glycerol. In practicing this described method with contemplation of operating it on a large, technical scale basis, it has been found that a number of serious difficulties are encountered which make the method unattractive for commercial use. In the first place, the formed salt of the phenol is very viscous and difficult to handle. The caustic, furthermore, does not dissolve completely in the phenol and part remains as lumps which are spots of high alkalinity which are detrimental to the formation of the desired products. These are difficulties which are largely responsible for the comparatively poor yields of products obtained. Another undesirable feature is that the sodium chloride formed by the second reaction remains in solution in the reaction and upon working up the mixture by the usual distillation methods, the salt cakes and deposits on the heating surfaces of the stills.

We have now found that this method can be made practicable for technical scale use and the difficulties obviated by employing an improvement which we have discovered. The process of our invention comprises reacting an alkali metal hydroxide with a phenol to form the alkali metal salt of the phenol and subsequently reacting the salt of the phenol with a derivative of a trihydric alcohol which contains at least one hydroxy group thereof substituted by a halogen atom, both reactions being conducted in the presence of a sufficient amount of a dioxane as the sole solvent added to the reaction mixture so as to precipitate formed alkali metal salt from the reaction mixture under the reaction conditions during the second reaction. By conducting each of the reactions in the presence of the specified solvent, the yield of the desired product is higher than in its absence. Besides the better yields obtainable, the use of the solvent provides a means of separating salt, which is a product of the reaction, from the reaction mixture. Thus, after reaction has been completed, this salt may be filtered, centrifuged or otherwise removed from the reaction mixture and the inherent difficulties encountered in distilling a mixture containing large amounts of salt obviated.

The reactions in the process of the invention are conducted with a dioxane as the sole added solvent in the reaction mixture. Of the dioxanes the lower members of the series are particularly suitable such as dioxane, 2,5-dimethyl dioxane-1,4, 2,5-diethyl dioxane-1,4, tetramethyl dioxane and the like. The dioxane in the reaction mixture is inert therein as well as having the characteristic that alkali metal halide salt formed by the etherification reaction of the process is substantially insoluble therein. The dioxane also has an appreciable solubility for water. This property of the solvent employed is desirable since the alkali metal salt of a phenol used as one reactant is prepared in the process by reacting a phenol with an alkali metal hydroxide and then the halogen-containing derivative of the trihydric alcohol is added to the reaction mixture without the removal of water therefrom which is formed in the first reaction. With water present in the reaction mixture in this manner, the appreciable solubility of the dioxane solvent for water enables the reaction mixture to be maintained in a homogeneous state with only a single liquid phase. While the reaction may be carried out with a two phase system, better results are realized when only one phase exists. The substantial insolubility of the formed alkali metal salt in the dioxane is also desirable. Some indication of the suitability of dioxane in this respect was gained by determining the solubility of salt (NaCl) in mixtures of ethyl alcohol or dioxane which contained about 10% of water in solution. Mixtures of 1500 cc. of solvent to which had been added 123.5 cc. of water were saturated with salt and the salt solubility found in grams per 1500 cc. of solvent was as follows:

Ethyl alcohol _____ 4.14
Dioxane _____ 0.84

The low salt solubility in the dioxane is apparent and is indicative of the suitability of it as a sole solvent or reaction medium.

Since one of the purposes of using a dioxane in the reaction mixture is to provide a means of removing salt formed by the reaction therefrom, it is desirable that the reaction be conducted in the presence of sufficient solvent to permit salt to be precipitated from the reaction mixture. Although all of the salt from the reaction is not precipitated from the mixture by the presence of the solvent, suitable choice of the particular dioxane and the amount can rid the reaction mixture of a large proportion of the salt. The particular amount of the solvent to be used will, of course, be largely determined by the dioxane employed, the reactants used and the product obtained. Ordinarily, the use of 20 per cent or more of the constituents contained in the reaction mixture is satisfactory. The solvent, being inert, may be recovered from the reaction mixture upon completion of the reaction and reused in further reaction mixtures.

In the execution of the process, an alkali metal salt of a phenol is reacted with a derivative of a trihydric alcohol wherein at least one hydroxy group of the alcohol is substituted by a halogen atom. A variety of compounds is included within the scope of the latter reactant. Typical compounds include halohydrins of trihydric alcohols such as glycerol monochlorhydrin, glycerol dichlorhydrin, monobromhydrin of alpha phenyl glycerol, monochlorhydrin of pentaglycerol, dichlorhydrin of alpha ethyl gamma cyclopentyl glycerol, etc.; epihalohydrins such as epichlorhydrin, epibromhydrin of beta methyl glycerol, epiiodohydrin of alpha ethyl glycerol, epichlorhydrin of phenyl glycerol, epichlorhydrin of pentaglycerol, etc.; alkyl ethers of glycerine halohydrins such as gamma methyl ether of glycerol alpha monochlorhydrin, beta methyl ether of glycerol alpha monochlorhydrin, alpha methyl ether of glycerol beta bromhydrin, gamma ethyl ether of glycerol alpha monoiodohydrin, gamma methyl ether of alpha methyl glycerol alpha monochlorhydrin, beta isopropyl ether of beta ethyl glycerol chlorhydrin, amyl ether of pentaglycerol chlorhydrin, alpha secondary butyl ether of alpha phenyl glycerol beta monobromhydrin, etc. and the like together with their homologues, analogues and suitable substitution products.

The other reactant employed in the process consisting of an alkali metal salt of a phenol includes any alkali metal salt of any phenol. Broadly "a phenol" is defined as an aromatic compound containing at least one hydroxy group linked directly to a carbon atom embraced in an aromatic nucleus. A phenol thus includes both the mono- and polyhydroxy compounds which may be either mono- or polynuclear in character and may be further substituted, if desired. Among representative compounds included within the class are: resorcinol, quinol, catechol, orcinol, homo-catechol, pyrogallol, phlorglucinol, hydroxy-quinol, dihydroxy naphthalene and the like together with their homologues, analogues and suitable substitution products such as guaiacol, pyrogallol dimethyl ether, etc. A particularly preferred group are the phenols which contain a single hydroxy group and of these, the compounds which are mononuclear are especially suitable.

Some representative phenols of this group are: phenol, ortho cresol, metal cresol, para cresol, the xylenols, ethyl phenol, tertiary butyl phenol, tertiary amyl phenol, diphenylol, the higher alkylated phenols, and the like as well as polynuclear phenols like alpha naphthol, beta naphthol and the like including their homologues, analogues and substitution products, it only being necessary that the compound contain a hydroxyl group linked directly to an aromatic nucleus. By reacting such a phenol with an alkali metal hydroxide, the desired metal salt of the phenol is obtained. Ordinarily, alkali metal hydroxides are preferred for this purpose. The base in powdered form is preferred. Largely because of cheapness and availability of sodium hydroxide, this compound is most preferred.

The process of the invention is executed by heating a phenol to which the dioxane is added as the sole reaction medium and an alkali metal hydroxide is added to the mixture whereby the alkali metal salt of the phenol is formed by reaction during the heating. For this purpose, the alkali metal hydroxide is utilized per se preferably in the form of a powder. The resulting metal salt of the phenol is then reacted with a derivative of a trihydric alcohol, preferably a glycerine, containing one or more hydroxy groups replaced by a halogen atom whereby the desired aryl ether is formed. The reaction is effected by adding the halogen-containing trihydric alcohol derivative to the reaction mixture containing the salt of the phenol and heating the reactants. The reaction with the metal salt of the phenol to form the desired aryl ether is preferably conducted at a temperature between about 50° C. and 200° C. A most preferred temperature is in the neighborhood of about 100° C. With higher temperatures it may be desirable to employ superatmospheric pressures in order to keep the constituents of the reaction mixture substantially in the liquid phase. Upon completion of the reaction, formed salt may be removed from the reaction mixture by filtration, preferably, or by decantation, centrifugation, etc. The desired aryl ether may then be recovered, this recovery preferably being done by distillation under reduced pressure, although it may be desirable to top off the solvent, water and other light materials at ordinary pressure.

An aryl ether of glycerol was prepared without the use of a dioxane in the following manner.

The products obtained from the process are valuable compounds which may be put to a variety of applications in industry. The particular compounds formed will, of course, depend upon the particular compounds employed as reactants in the process. In general, each hydroxy group of the derivative of a trihydric alcohol which has been replaced by a halogen atom will be converted to an aryloxy group. It is therefore desirable that the proportion of reactants employed in the reaction mixture be approximately as many mols of salt of a phenol as there are halogen substituted hydroxy groups in the derivative of the trihydric alcohol per mol of this latter reactant. Thus, for example, in preparing alpha gamma diphenyl ether of glycerol, sodium phenolate may be reacted with glycerol dichlorhydrin and it is preferable that two mols of the phenol salt be used per mol of the glycerol derivative. If desired, of course, larger or smaller ratios may be used. The same product may be prepared by using glycerol epichlorhydrin as the starting material. The reaction in this case is substantially the same as that involved with the above reactants. In the above reaction, epichlorhydrin appears to be an intermediate product along with free phenol which results from the dehydrochlorination of the glycerol dichlorhydrin by the sodium phenolate. The intermediate epichlorhydrin then reacts with the free phenol with the opening of the epoxy ring. While the reaction may be explained in this manner it may be that the other chloride atom is replaced by a phenoxy group before the epoxy ring is formed, but, in any event, the result is the same; a diether is formed. When glycerol epichlorhydrin is used as a starting material, it is therefore desirable that for each mol of epichlorhydrin employed there be used one mol of sodium phenolate and a mol of phenol. It is evident that in this case also, the preferred ratio of reactants is a mol of the phenol salt per mol of epichlorhydrin which contains a single hydroxy group substituted by a chlorine atom. Other ratios may be used, if desired.

The following examples are given for the purpose of illustrating in greater detail a method of executing the process of the invention and certain properties of a few novel products, but it is to be understood that it is not the intention to limit the invention to the particular mode of operation and other details given in the examples.

Example I

About two mols of commercial cresylic acid boiling from about 200° C. to 220° C. which consisted mostly of xylenols were heated to 105° C. to 110° C. and to this was added approximately 85 gms. of 96 per cent powdered sodium hydroxide. The mixture was stirred for about two hours at a temperature of 105° C. to 110° C. To the thus formed salt of the xylenols was then added about two mols of the gamma isopropyl ether of glycerol alpha monochlorhydrin over a period of two hours. After further stirring and heating for an hour, the crude glyceryl alpha isopropyl gamma xylyl di-ether was recovered from the reaction mixture by distillation in vacuo in a yield of about 90.1 per cent.

Example II

The run described in Example I was repeated, but the reaction was carried out in the presence of a solvent, dioxane, in which salt was not appreciably soluble. About two mols of the mixture of xylenols were taken and to this was added about 150 cc. of dioxane. The mixture was heated to 105° C. to 110° C. and about 85 gms. of 96 per cent sodium hydroxide were added and the mixture stirred at 105° C. to 110° C. for about two hours. To the hot solution was then added about two mols of alpha isopropyl glycerol gamma monochlorhydrin over a period of two hours followed by heating for an additional hour. The salt formed by the reaction was then filtered from the hot reaction mixture, the filtrate neutralized and the final product distilled under reduced pressure. The yield of the crude di-ether in this case amounted to about 94.6 per cent A further run using dioxane as the solvent gave a yield of crude di-ether of about 96.4 per cent.

While the crude product obtained was somewhat colored and possessed a phenolic odor, the use of the solvent gave a product of better color and considerably increased the ease of handling the reaction mixture in addition to better yields.

The product was purified by extracting it with caustic and washing with water followed by redistillation in vacuo. The refining process was carried out with 95 per cent recovery and gave a product of excellent color and practically no odor.

Example III

Glyceryl alpha isopropyl gamma phenyl diether was similarly prepared. About two mols of phenol and 150 cc. of dioxane were heated in a flask with stirring to 105° C. to 110° C. To this mixture was added 85 gms. of 96 per cent powdered sodium hydroxide and the mixture was stirred at 105° C. to 110° C. for about two hours. To the hot solution was added over a period of two hours about two mols of gamma isopropyl ether of glyceryl alpha monochlorhydrin with an additional hour of heating and stirring. The salt was then filtered from the hot reaction mixture, the filtrate neutralized and finally the product distilled under reduced pressure. The yield of the crude di-ether obtained was about 95.2 per cent. In a run repeating the above procedure, the yield amounted to about 95.5 per cent. The crude ether which was obtained was washed with 2N sodium hydroxide and then three times with water. After drying over calcium sulphate, the product was distilled under reduced pressure to obtain the di-ether with good color and little or no odor.

Physical constants and analytical data which were determined for the products are tabulated below:

| | Glyceryl alpha isopropyl gamma phenyl di-ether | Glyceryl alpha isopropyl gamma xylyl di-ether |
|---|---|---|
| Boiling point ° C | 133–134 at 3 mm. | 137 at 3 mm. |
| Specific gravity, $20/4$ | 1.0437 | 1.0133 |
| Refractive index, $20/n$ | 1.5019 | 1.4995 |
| Carbon per cent | 68.42 | 70.60, 70.62 |
| Theoretical | 68.5 | 70.60 |
| Hydrogen do | 8.67 | 9.30, 9.34 |
| Theoretical | 8.63 | 9.3 |
| Acetyl value, eq./100 gms | 0.471, 0.466 | 0.417, 0.419 |
| Theoretical | 0.475 | 0.419 |
| Phenols per cent | 0.061 | 1.19 |
| Total chlorine do | 0.162 | 0.044 |

Example IV

About 2.0 mols of phenol and 300 cc. of dioxane were placed in a flask fitted with a condenser and equipped for stirring. The mixture was heated to 92° C. and about 2.04 mols of 96 per cent powdered sodium hydroxide were added. After stirring for about 90 minutes at this temperature, about 2.0 mols of glycerol alpha monochlorhydrin were added slowly over a period of 2 hours. The temperature during this addition was from 103° C. to 105° C. Stirring was continued for an additional hour. The reaction mixture was then filtered while still hot and the salt obtained washed with three 150 cc. portions of dioxane. The product and washings were combined and carefully neutralized by addition of concentrated hydrochloric acid. Distillation was then carried out as rapidly as possible in a Claisen flask under reduced pressure. The presence of a small amount of solvent greatly aided the reaction in making the reaction mixture fluid and preventing local spots of high alkalinity. The product obtained, glyceryl alpha monophenyl ether, was a white, waxy solid which melted at 55° C. to 57° C. and distilled at 128.6° C. to 129.6° C. at 1 mm. The yield of the product amounted to 93.2 per cent.

The experiment was repeated with half the proportion of dioxane as in the above-described experiment. The yield obtained in this case was 90.8 per cent.

The critical nature of employing the solvent is indicated from the yields obtained in the above-described experiments and an experiment in which no solvent was used. In the latter case, the experimental conditions were essentially the same except that the reaction was conducted in the absence of the solvent. The yield of ether obtained in this case amounted to only 70.6 per cent.

Example V

Glyceryl alpha, gamma diphenyl ether was prepared by dissolving powdered sodium hydroxide in phenol and dioxane and adding epichlorhydrin with stirring to the hot solution. About 1.53 mols of powdered sodium hydroxide were dissolved in a mixture comprising about 3 mols of phenol and 225 cc. of dioxane at a temperature of about 95° C. One hour at this temperature was sufficient to obtain complete solution of the caustic. Then about 1.5 mols of epichlorhydrin were added over a period of 1¾ hours at a temperature of 100° C. to 105° C. The heating was continued for 1¼ hours longer to complete the reaction mixture and washed with hot dioxane. The filtrate was neutralized with concentrated hydrochloric acid, the solvent evaporated off and the ether distilled from a Claisen flask in an oil bath. The product distilled at 180° C. to 190° C. at 1 mm. Hg pressure and was obtained in a yield of about 93.9 per cent.

Glyceryl alpha, gamma dicresyl ether was obtained in a synthesis like that described above using as starting material a cresylic acid boiling from 200° C. to 220° C. The product boiled at 190° C. to 200° C. at 0.5 to 1.0 mm. and was obtained in 93.5 per cent yield.

We claim as our invention:

1. A process for the production of an aryl ether of a trihydric alcohol which comprises reacting a phenol with an alkali metal hydroxide to form an alkali metal salt of said phenol and subsequently reacting said alkali metal salt of the phenol with a derivative of a trihydric alcohol, which derivative contains at least one hydroxy group substituted by a halogen atom, each of said reactions being conducted in the presence of a sufficient amount of a dioxane as the sole added reaction medium to precipitate alkali metal halide salt formed in the etherification step from the reaction mixture under the reaction conditions.

2. A process for the production of an aryl ether of glycerol which comprises reacting a phenol with an alkali metal hydroxide to form an alkali metal salt of said phenol and subsequently reacting said alkali metal salt and a phenol with epichlorhydrin, each of said reactions being conducted in the presence of at least 20% by weight, based on the weight of all reactants, of dioxane as the sole added reaction medium.

3. A process for the production of an aryl ether of glycerol which comprises reacting a mononuclear phenol with an alkali metal hydroxide to form an alkali metal salt of said phenol and subsequently reacting said alkali metal salt with a chlorhydrin of glycerol, each of said reactions being conducted in the presence of at least 20% by weight, based on the weight of all reactants, of dioxane as the sole added reaction medium.

4. A process for the production of an aryl ether of glycerol which comprises reacting phenol with powdered sodium hydroxide to form sodium phenolate and subsequently reacting said sodium salt with mono-isopropyl ether of glycerol monochlorhydrin while having present in the reaction mixture during each of said reactions at least 20% by weight, based on the total weight of all reactants, of dioxane as the sole solvent added to the reaction mixture.

KENNETH E. MARPLE.
THEODORE W. EVANS.